US012577095B2

(12) United States Patent
Willerton et al.

(10) Patent No.: US 12,577,095 B2
(45) Date of Patent: Mar. 17, 2026

(54) MULTIPURPOSE CONTAINER OPENER

(71) Applicants: James Willerton, Endicott, NY (US); Terri Willerton, Endicott, NY (US)

(72) Inventors: James Willerton, Endicott, NY (US); Terri Willerton, Endicott, NY (US)

( * ) Notice: Subject to any disclaimer, the term of this patent is extended or adjusted under 35 U.S.C. 154(b) by 249 days.

(21) Appl. No.: 17/700,757

(22) Filed: Mar. 22, 2022

(65) Prior Publication Data

US 2022/0297994 A1 Sep. 22, 2022

Related U.S. Application Data

(60) Provisional application No. 63/164,112, filed on Mar. 22, 2021.

(51) Int. Cl.

*B67B 7/44* (2006.01)
*B67B 7/14* (2006.01)
*B67B 7/16* (2006.01)
*B67B 7/18* (2006.01)
*B67B 7/46* (2006.01)

(52) U.S. Cl.

CPC .................. *B67B 7/44* (2013.01); *B67B 7/14* (2013.01); *B67B 7/16* (2013.01); *B67B 7/18* (2013.01); *B67B 7/30* (2013.01)

(58) Field of Classification Search

CPC .... B67B 7/02; B67B 7/04; B67B 7/06; B67B 7/12; B67B 7/14; B67B 7/15; B67B 7/16; B67B 7/18; B67B 7/20; B67B 7/30; B67B 7/44

See application file for complete search history.

(56) References Cited

U.S. PATENT DOCUMENTS

| | | | | | |
|---|---|---|---|---|---|
| 2,031,420 | A * | 2/1936 | Lebherz | B67B 7/18 | 81/3.4 |
| 2,046,334 | A * | 7/1936 | Loeber | A47L 13/08 | D7/693 |
| 2,046,804 | A * | 7/1936 | Youngblood | B67C 9/00 | 215/322 |
| 2,082,699 | A * | 6/1937 | Keppinger | B67B 7/18 | D8/39 |
| 3,143,904 | A * | 8/1964 | Yerkes | B67B 7/44 | 81/3.4 |
| D296,293 | S * | 6/1988 | Wheeler | D8/43 | |
| D302,232 | S * | 7/1989 | Hoffman | D8/18 | |
| 5,664,466 | A * | 9/1997 | Miller | B67B 7/18 | 81/3.4 |
| 8,607,668 | B1 * | 12/2013 | Frank | B67B 7/16 | 81/3.09 |

(Continued)

*Primary Examiner* — Robert J Scruggs

(74) *Attorney, Agent, or Firm* — Brennan, Manna & Diamond, LLC

(57) ABSTRACT

The present invention relates to a lid removal or container opener tool. The tool is a standalone device made of a rigid material and has a plurality of container opening slots and edges. More specifically, the tool is a tapered and has a corrugated tapered surface and a smooth tapered surface. The tapered surfaces along with bottom surface of the tool is used for accommodating and securing a lid to open. The tool can be easily grasped in the palm and fingers for twisting. A prying slot is used for opening pry-type caps. A protrusion, a linear corrugated slot and a linear smooth slot are also used for opening a variety of containers.

4 Claims, 5 Drawing Sheets

(56) References Cited

U.S. PATENT DOCUMENTS

| | | | | |
|---|---|---|---|---|
| 2006/0266160 | A1* | 11/2006 | Yeh | B67B 7/44 81/3.4 |
| 2009/0151513 | A1* | 6/2009 | Gross | B67B 7/18 81/3.55 |
| 2016/0304330 | A1* | 10/2016 | Cardinal | B67B 7/16 |
| 2021/0316976 | A1* | 10/2021 | Selenberg | B67B 7/18 |

* cited by examiner

MULTIPURPOSE CONTAINER OPENER

CROSS-REFERENCE TO RELATED APPLICATION

The present application claims priority to, and the benefit of, U.S. Provisional Application No. 63/164,112, which was filed on Mar. 22, 2021, and is incorporated herein by reference in its entirety.

FIELD OF THE INVENTION

The present invention relates generally to the field of kitchen and other personal use accessories. More specifically, the present invention relates to a multipurpose container opener tool for opening a wide variety of items, such as paint can lids, medication bottles, jars, containers, and other items which may have a threaded or other closure or cap. The tool features a V-shaped galvanized steel accessory that has an undulating or corrugated edge and a smooth edge for accommodating and securing a lid, cap or closure. An opening slot is disposed for prying crimp-type caps. A protrusion is disposed for pulling rubber caps and piercing, tearing, puncturing paper, foils and other seals. Accordingly, this disclosure makes specific reference thereto the present invention. Nonetheless, it is to be appreciated that aspects of the present invention are also equally applicable to other like applications, devices and methods of manufacture.

BACKGROUND

By way of background, beverage cans and containers have lids, closures and caps that are required to be opened to allow the content of the containers to be used or consumed. A manual twisting or pulling force or effort is required to open or remove the lid, caps or other closures of containers of everyday items such as the sauces, pickles, jam, carbonated drinks and other consumer goods. Generally, for most types of caps, a cap or a lid is grasped with the fingers and thumb and the cap is twisted or pulled to gain access to the interior of the container. The effort can be difficult for some users and may also injure the fingers or fingernails of the user. People manually rotate, pull, and dislodge the cap. It is not only time consuming and difficult but can also cause injury. On occasion, the caps are so tightly secured to the container that even a healthy person of ordinary strength may have difficulty unscrewing the bottle cap or opening the container. Further, it is often difficult for the elderly, children and those small in stature to open the caps. Moreover, if excessive use is needed, the container can break causing the contents to spill and potentially injure the individual.

People often use a variety of tools such as wrenches, pliers, vice grips and other tools for opening and dislodging caps. However, currently available tools can be ineffective and are generally used with one or two types of caps and thus have limited application. In addition, using tools not ordinarily intended for opening containers can cause damage to the cap or closure making resealing of the container difficult, if not impossible. Moreover, these tools are not easy to use and may cause injury to an individual. Currently available tools are specifically designed either for pressurized beverages or non-pressurized beverages. People desire a container opener tool which is convenient to use and one that can be used with most types of caps and lids of containers, jars, bottles, and vessels.

Therefore, there exists a long-felt need in the art for an opener tool that can be used for opening various types of caps, closures and lids. There is also a long-felt need in the art for a container opener tool that can be easily used by the elderly population, young children, and others with compromised abilities to facilitate opening the container. Additionally, there is a long-felt need in the art for a container tool that eliminates the strain involved in opening tight lids, caps and other closures. Moreover, there is a long-felt need in the art for a container opening tool that eliminates the need to use various tools such as wrenches for opening caps and lids. Further, there is a long-felt need in the art for an opener that does not cause injury to an individual using the tool for opening a container. Finally, there is a long-felt need in the art for an opening tool that can be used for a wide variety of lids and caps while eliminating the strain involved in opening jars, containers, and bottles.

The subject matter disclosed and claimed herein, in one embodiment thereof, comprises a cap or closure removal tool also referred to as a container opener tool. The tool is used for opening a variety of caps, lids or closures and provides for the pulling and twisting of the caps and other closures without the need to apply much force and as such, causes less strain on the human hand. The tool is a one-piece rigid body, manufactured from metal, steel, aluminum or hard plastic and has a top surface and a bottom surface. The body may also have a plastic core and then a metal coating or cap pieces on the areas where the closure is engaged by the tool. The body is sized and configured so that it is suitable for holding between the palm and fingers for twisting and pulling of a hand or about 3 to 5 inches. The body has a front edge, a rear or back edge and first and second tapered side surfaces running from the ends of the front edge to the ends of rear or back edge. The front edge has a width that is less than the rear edge thereby providing a tapered shape extending internally of the outer edges of the tool. The front edge has a central pull bar protrusion extending from front edge at an angle. The tapered side surfaces are beveled, with the first tapered surface having an undulating or corrugated edge and the second tapered surface has a smooth edge. A cap opening slot is disposed in the platform and has a curved edge and a straight edge for opening pry-type crimp caps. A ring hole is provided for hanging the tool on a wall mounted hook and, for opening a lid of a small bottle, a linear corrugated slit and a plain slit are disposed across a portion of the platform.

In this manner, the beverage container opener of the present invention accomplishes all of the forgoing objectives and provides users with a novel cap or closure removal or container opener tool that enables users to easily grip and turn hard to open lids and tops with little to no resistance. The tool allows individuals to open a wide variety of items, such as paint can lids, medication bottles, jars, and other consumer goods packaging without requiring any additional tool or accessory. The tool has a one-piece structure and has an ergonomic and user-friendly design.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a cap or lid removal or container opener tool. The tool further includes a one-piece rigid platform or body having a top surface and a bottom surface. The platform or body is suitably sized for holding between the palm and fingers of a human hand for twisting and pulling to facilitate the removal of the cap, lid or top from the container. The platform or body has a front edge, a rear edge and first and second, or a pair, of tapered side surfaces. The front edge has a width that is less than the rear edge. The front edge has a central pull bar protrusion extending off the front edge. The tapered side surfaces are beveled, and the first tapered surface has an undulating or corrugated edge, and the second tapered surface has a smooth edge. An opening or slot is disposed in the platform or body and has a curved edge and a straight edge for opening pry-type crimp caps. A ring hole is provided for hanging the tool on a wall mounted hook and also for opening a lid of a small bottle. A linear corrugated slit and a plain slit is disposed across a portion of the platform.

In yet another embodiment, a tool for removing a cap or lid from a container is disclosed. The tool comprising a front edge, a rear edge, and a first and second tapered side surfaces such that the front edge has a width that is less than the width of the rear edge. A slot or opening aperture is provided near the rear edge for opening a pry-type crimp cap, puncturing a foil or plastic seal or similar closure. A ring aperture is provided near the front edge for hanging the tool on a wall mounted hook and for use in opening a small cap. An undulating or corrugated edge is provided and runs along one of the first and second tapered side surfaces and a smooth edge runs along the other of the first and second tapered side surfaces. Each of the side surfaces have a side rail that extends downwardly from the central portion of the body and generally runs the length of the body and each of the side surfaces, but does not cover any portion of the width of the central body. The rear surface of the tool, and the side surfaces support a lid, top or other closure thereby allowing twisting of the tool to open the lid, top or other closure.

In yet another embodiment, a container opener configured to open a plurality of containers and other consumer good packages is disclosed. The container opener comprising a rigid body made from one of steel, aluminum, metal, alloys, a rigid plastic material or a plastic core with the opening features provided as a metal component or a metal coated plastic. A protrusion extending from the front edge for piercing and opening a spout or breaking a seal. A pry cap opener disposed in the body for prying caps, lids and other closures. A pair of tapered surfaces configured to accommodate a lid, closure or top and thereby allowing a user to twist the opener for opening the lid, top or closure.

In yet another embodiment, the opener is made from steel, such as galvanized steel. In yet another embodiment, the opener is 6" long and has a maximum width of 4". In yet a further embodiment, the opener is generally V-shaped.

Numerous benefits and advantages of this invention will become apparent to those skilled in the art to which it pertains upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
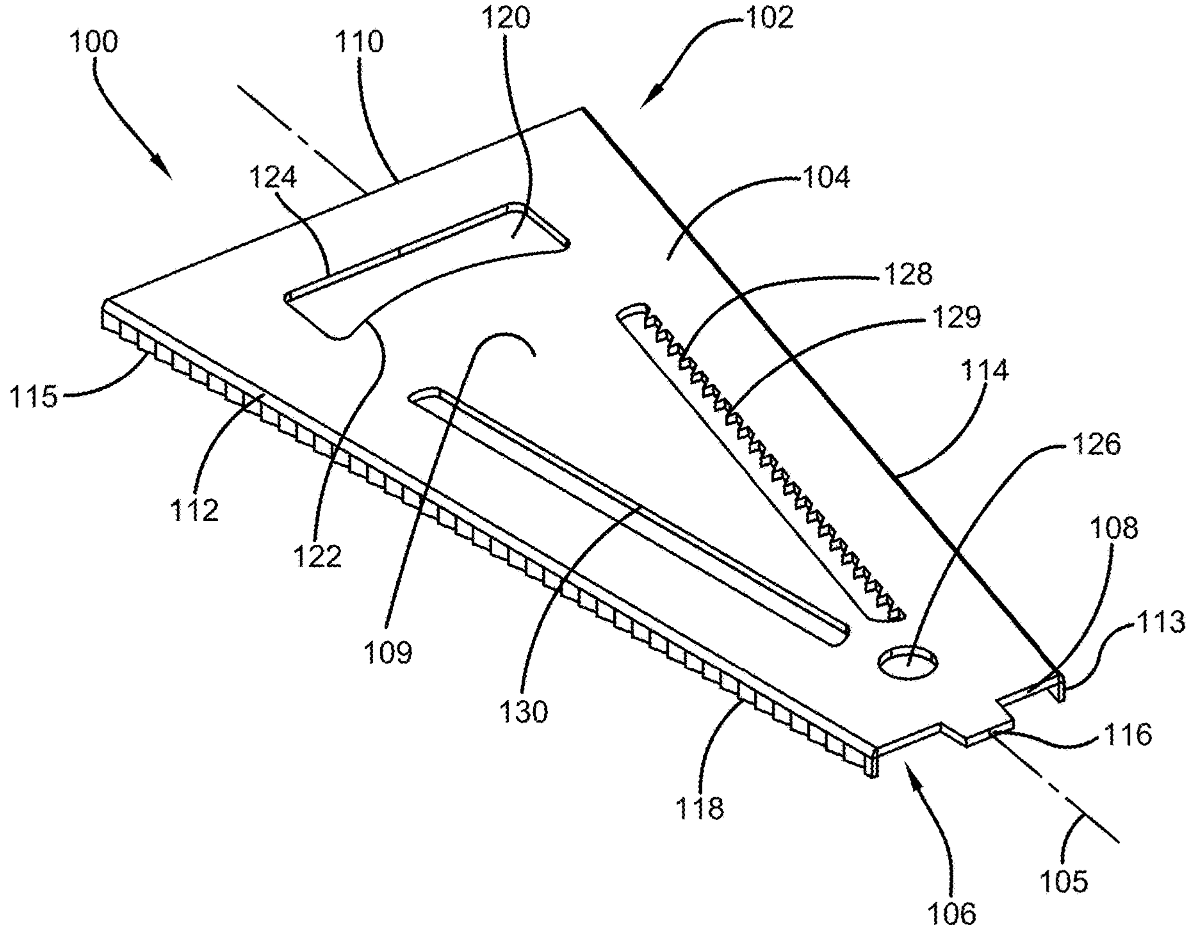
FIG. 1 illustrates a perspective view of one potential embodiment of a container opener or top or closure removal tool of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

In a further embodiment, a combination opening tool having a body with front and rear edges and a central portion with first and second surfaces, with each of the first and second surface having side rails extending downwardly from the body. One of the first and second surfaces having a corrugated edge with a series of teeth. The body portion having a second corrugated edge and the body portion having a smooth slot, and wherein the corrugated portion is for gripping a lid of a container and the second corrugated portion is for opening a safety seal.

As noted above, there is a long-felt need in the art for a lid removal or an opener tool that can be used for opening various types of caps, closures, and lids. There is also a long-felt need in the art for a lid removal or container opener tool that can be easily used by elderly population, young children, and others with compromised abilities or limited dexterity or hand strength. Additionally, there is a long-felt need in the art for a lid or top removal tool or a container tool that eliminates the strain involved in opening tight jars, bottles, and containers. Moreover, there is a long-felt need in the art for a container opening or lid or closure removal tool that eliminates the use of various other tools such as wrenches, pliers and the like for opening caps, closures, tops, and lids. Further, there is a long-felt need in the art for an opener that does not cause injury to an individual using the tool for opening a container. Finally, there is a long-felt need in the art for an opening tool that can be used for a wide variety of lids, tops, closures, and caps while eliminating the strain involved in opening tight jars, containers and other consumer goods and packages.

The present invention, in one exemplary embodiment, is a novel lid removal tool or a container opener configured to open a plurality of containers and other consumer goods packages. The container opener comprises a one-piece body, which is preferably rigid. A protrusion extends from front edge for piercing seals and other closures and for opening a spout. A pry cap opener is disposed within a central portion of the body and closer to the back or rear end than the front end for prying caps. First and second tapered surfaces are provided and configured to accommodate a lid and thereby allowing a user to twist the opener for opening the lid. The first and second side surfaces each have a side rail extending downwardly from the central body portion. The side rails extend the length of the body but do not cover over any portion of the width of the body. The opener further has a linear corrugated or undulating slot or opening and a linear smooth slot for opening various types of lids and piercing paper.

Although the term “container” is often used in the present disclosure, any container is intended, and may include, without limitation, bottles, jars, canisters, pill and medicine bottles, jugs, cans, drums, and all other containers and consumer packages of various shapes, sizes, and capacities on which the present invention may be used.

Referring initially to the drawings, FIG. 1 illustrates a perspective view of one potential embodiment of a lid removal tool or container opener of the present invention in accordance with the disclosed specification. The lid removal tool or container opener 100 of the present invention is a unique one-piece opener tool preferably made of a rigid material such as stainless steel, galvanized steel, aluminum, metal, hard plastics, fiberglass, composites or combinations thereof and is used for accommodating and opening different size lids, tops, cans, consumer packages and bottles. The tool 100 allows individuals to easily grip and turn hard for opening lids, closures, and tops with little to no resistance.

Figure 2:
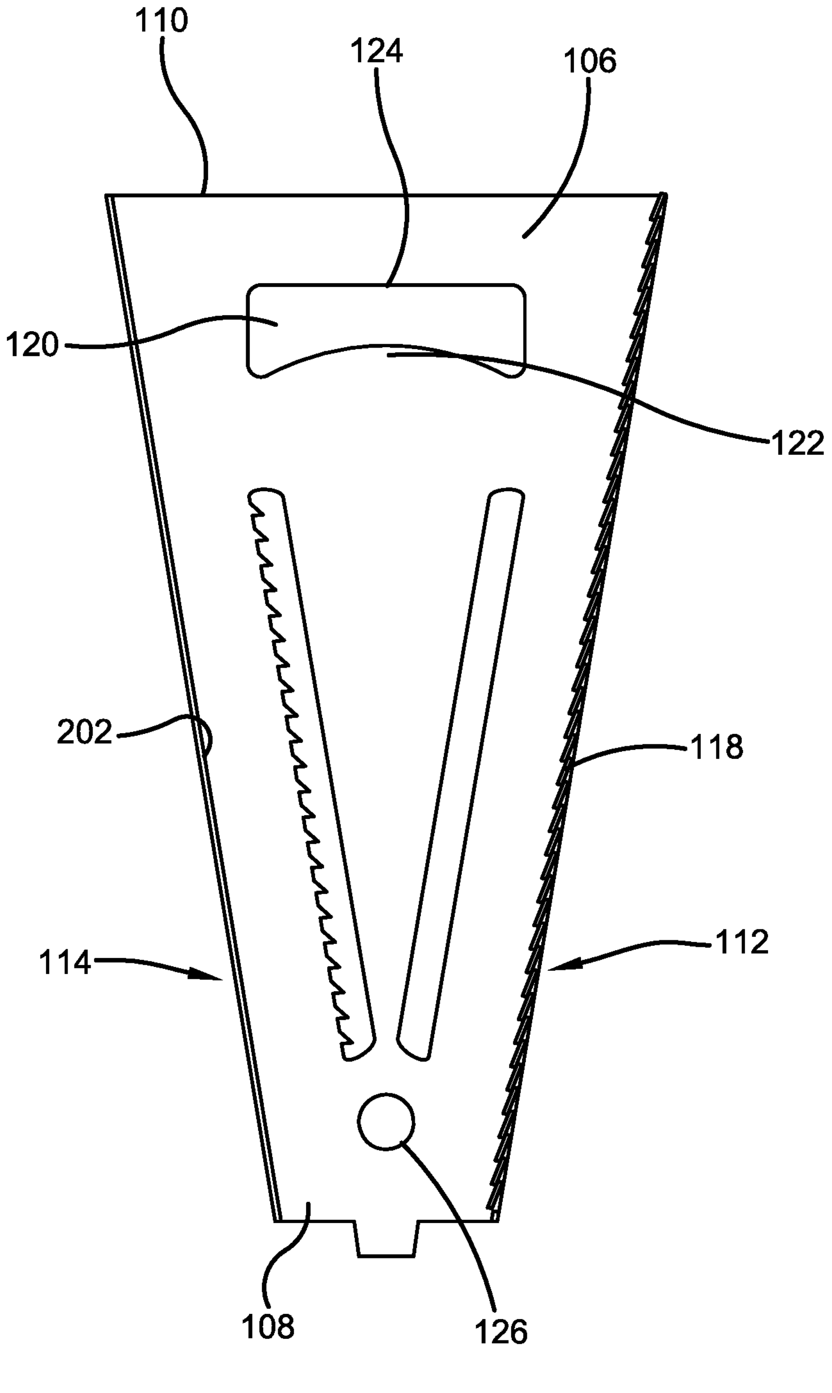
FIG. 2 illustrates a bottom view of the multifunctional top or closure removal tool or bottle opener of the present invention in accordance with the disclosed architecture.
Figure 3:
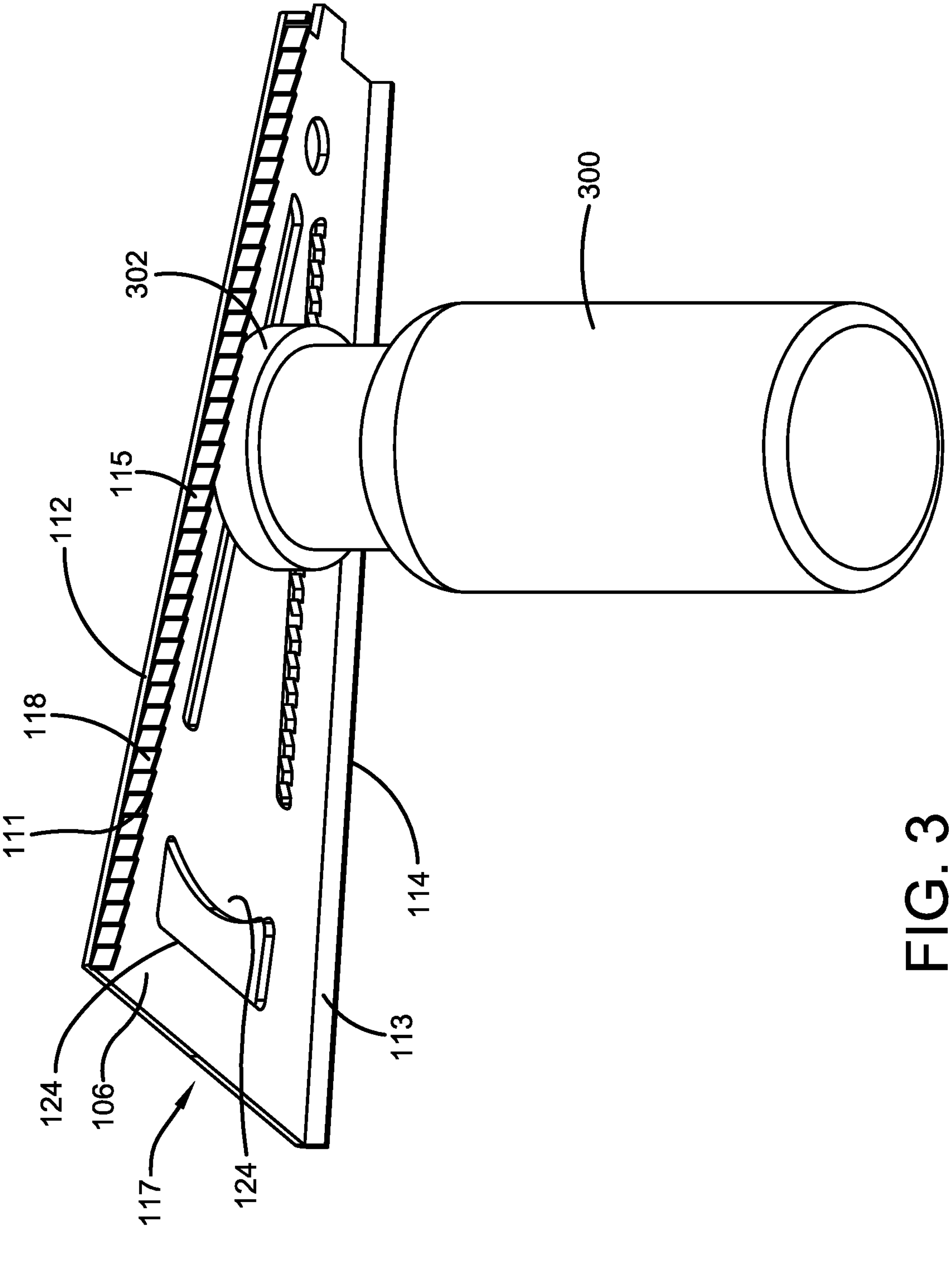
FIG. 3 illustrates a perspective view of the opener tool of the present invention used for opening a lid of a large jar in accordance with the disclosed architecture.
Figure 5:
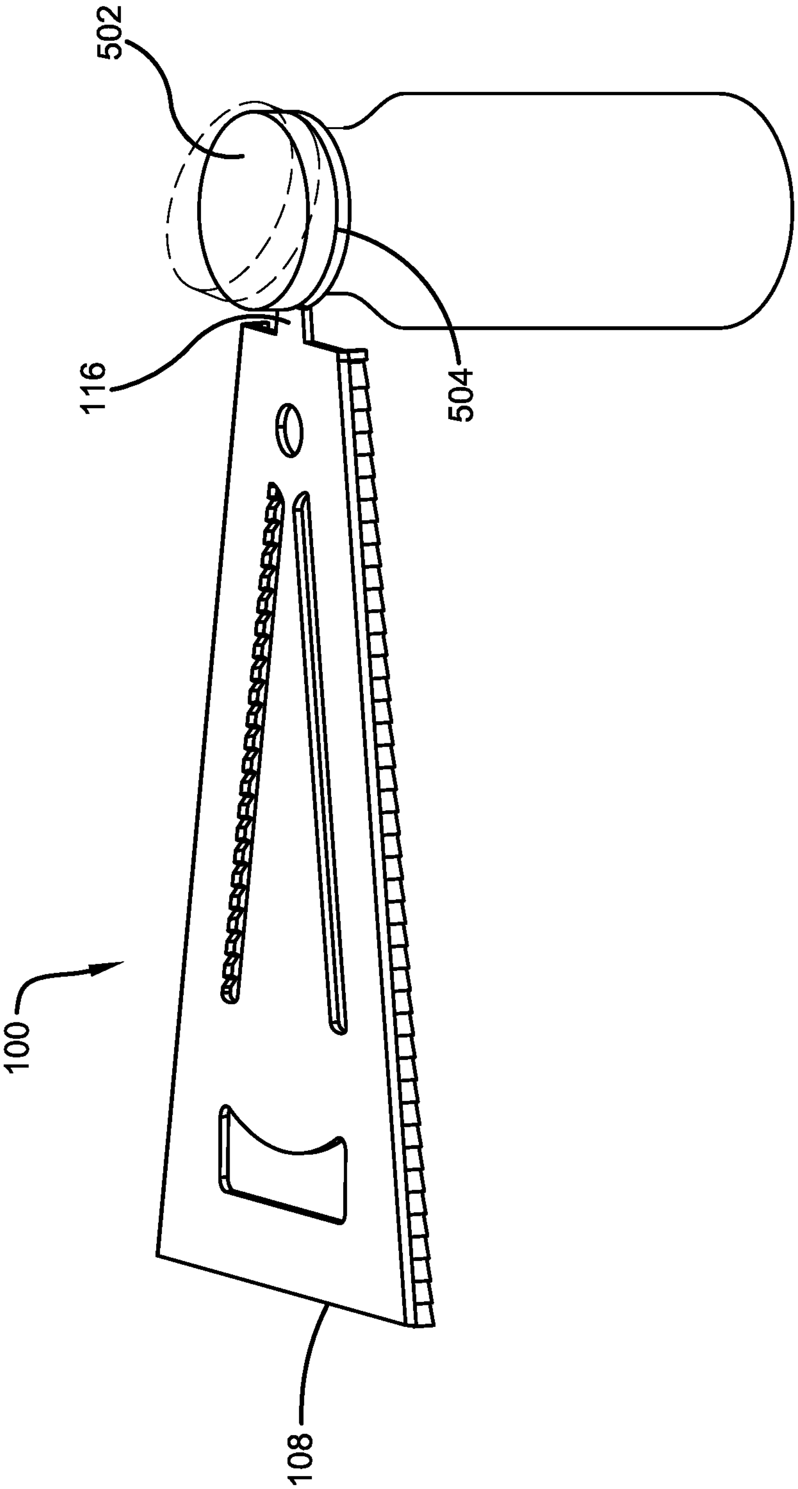
FIG. 5 illustrates a perspective view showing the consumer goods container opener tool of the present invention used for opening a medicinal or pill container in accordance with the disclosed architecture.

More specifically, the lid removal or opener tool 100 has a tapered V-shaped platform or central body 102. The central body or platform 102, having a central portion 109, has a top surface 104 and a bottom surface 106 which are generally of equal dimension. The V-shaped platform 102 has a front edge 108 and a rear edge 110 and first and second tapered side surfaces 112, 114. Each of the side surfaces has a rail 113 and 115 (see also FIG. 3) which extend downwardly from the top surface. The rails 113 and 115 extend the length of the side surfaces and do not cover any portion of the front edge or rear edge 108, 110. The front edge 108 has a width that is less than the width of the rear edge 110 and the front edge width is less than half of the rear edge width. The front edge 108 has a central pull bar protrusion 116 that is used for opening a lid as illustrated in FIG. 5. The central pull bar protrusion 116 can also be used for piercing a beverage container such as a tetra pack or breaking a foil or plastic seal on other consumer good packages. The protrusion 116 extends from the front end by an amount ranging from ¼" of an inch to about 1.5 inches, with about ½" to 1 inch being preferred. The tapered side edges 112, 114 are beveled inwardly for securing and accommodating different size lids, tops, cans, closures, and bottles between the tapered side edges 112, 114 as shown in FIG. 3. That is, as the top of the container is moved from the back or rear edge to the front edge, the teeth 111 on side surface 112 grip the top or container lid between the side surface rail 115 of side surface 112 and rail 113 of side surface 114. The first tapered surface 112 has a series of undulations forming a corrugated edge 118 and the second tapered surface 114 has a smooth edge along rail 113 (as shown in FIG. 2). The side surfaces 112, 114, along with the rails 113, 115, form a channel 117 in which to insert the container for opening. Each of the teeth 111 of the corrugated edge 118 range in size from 0.1" to 0.5" with 0.1" to 0.25" being preferred. Different size teeth may be provided in the tool 100 to accommodate different types of containers that will typically be opened. For example, a tool 100 with larger teeth, for example up to 0.5" may be used when opening metal tops whereas smaller teeth may be used when opening plastic caps such as medicine vials so that the cap is not shredded by the teeth when the user attempts to open the container.

Figure 4:
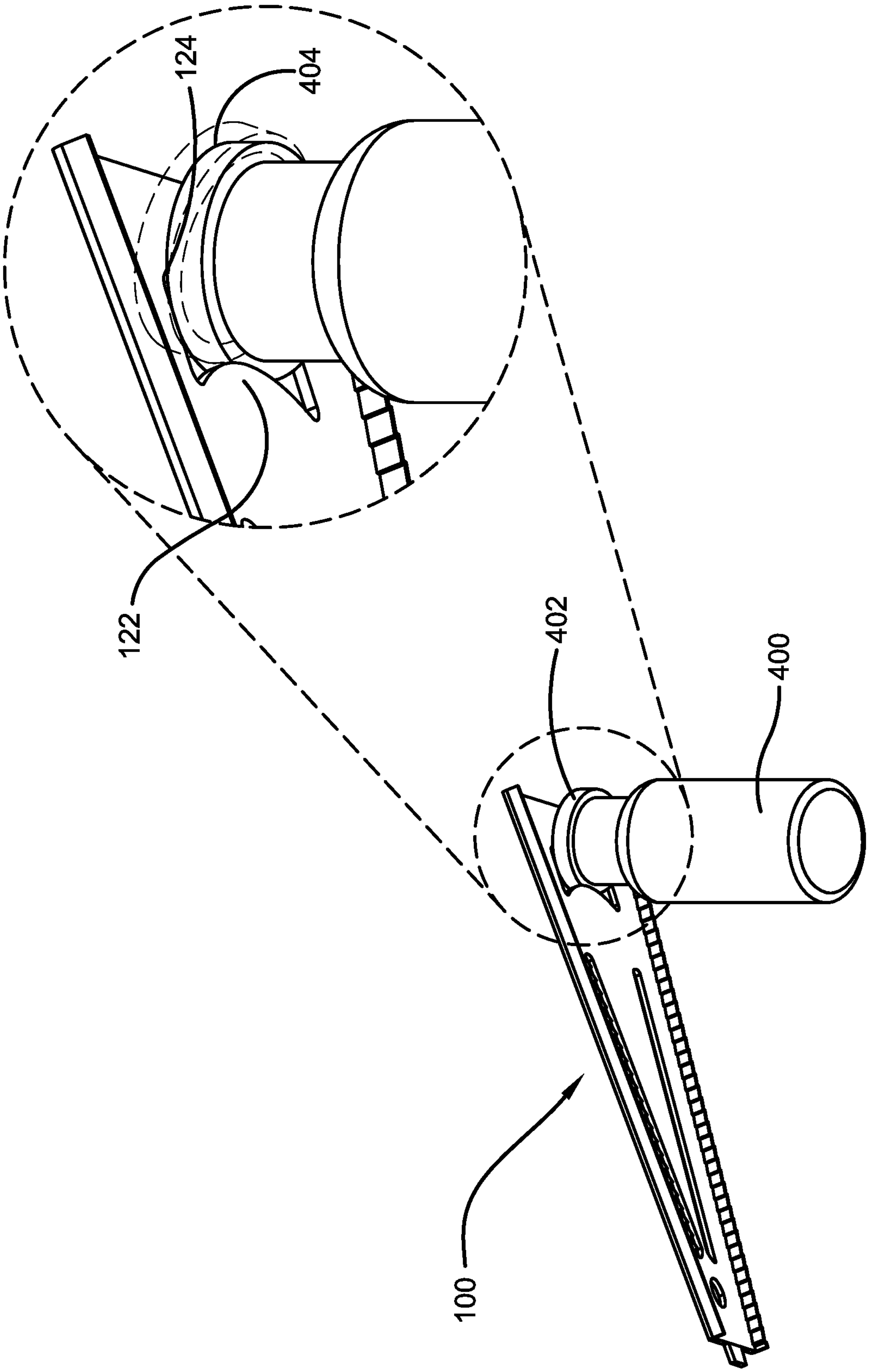
FIG. 4 illustrates a perspective view showing the opener tool of the present invention used for opening a pry-type crimp cap in accordance with the disclosed architecture.

The tool 100 has a cap opening slot 120 near the rear edge 110 and disposed substantially centrally in the central body portion and equally spaced from each of the side surfaces for opening pry-type bottle crimp-on bottle caps of sealed beverage containers such as shown in FIGS. 3 and 4. The opening slot 120 is space about ½ inch to 2 inches from the rear edge of the central body. More specifically, the opening slot 120 has straight, sharp and curved beveled edges 124, 122 wherein the curved beveled edge 122 is configured to fit under a cap to be pried and the cap is supported from the top by the straight edge 124 during prying operation.

The ring opening 126 is used for opening lids of pill and other medication bottles. The ring opening 126 is small in size and may have a diameter in the range 0.5"-0.75" and may also be used for hanging the tool 100 on a wall mounted hook. The ring opening 126 is located in a forward portion of the body. A linear beveled corrugated slot 128 (see FIG. 1) and a linear beveled smooth slot 130 are disposed in the tool 100 central body for opening caps, lids, and other closures. The corrugated slot 128 and the beveled smooth slot 130 are tapered parallel to the side surfaces and rails. The linear beveled corrugated slot 128 may be used for piercing or breaking a safety seal which surrounds the top of a consumer product as well as those which may be provided with a medicine bottle. The corrugated slot or second set of corrugations 128 may also be used for piercing or creating an opening in blister packs, foil packs, packing tape or other similar materials. The individual teeth 129 of the corrugated slot 128 are smaller than the individual teeth provided in the corrugated edge 118. A longitudinal axis 105 passes through the bottle cap opening slot 120, extends between the smooth slot 130 and the corrugated edge beveled linear slot 129, and passes through the ring opening 126, as best shown in FIG. 1.

The lid removal or opener tool 100 enables a user to easily open various types of bottles, cans, jars, and other consumer packages without applying much force. The tool uses a combination of first and second corrugations, with the first larger set of corrugated teeth used to hold the top of the container in position when the individual twists the container to open the lid and the second smaller set of corrugations used to break any plastic tamper evident film that may be provided around the top of the container. The combination corrugations facilitate the opening of the container without need to seek any additional tools. The tool 100 can be easily operated by seniors, children, those with dexterity, arthritic conditions and elderly people. The novel V-shape tapered design allows for easy handling and gripping of the tool 100 while opening a container. The container opener tool 100 is configured to use for opening containers having various sizes.

In the present embodiment, the tool 100 is 7.5" long and 4" wide along the rear edge 110. Further, the tool is 2" wide along the front edge 108.

FIG. 2 illustrates a bottom view of the multifunctional bottle opener 100 of the present invention in accordance with the disclosed architecture. As illustrated, the first beveled side surface 112 terminates, and the rail 113 in corrugated edge 118 having a plurality of teeth and the second beveled side surface 114 and rail 115 terminates in a smooth edge 202. The side surfaces 112, 114 extend downward to about 0.25" to 2" inches, thereby providing support to a lid to be opened using the tool 100 as illustrated in FIG. 3. The slope angle of side surfaces 112, 114 is about 120 degrees, with a range of about 120 degrees to 150 degrees or 30 degrees to 60 degrees from vertical.

In use, the rear surface 106 supports a lid when the lid is positioned between the side surfaces 112, 114. The rear surface 106 is planar and does not cause any physical damage to a lid. Further, the rear surface 106 has a uniform thickness from the front edge 108 to the rear edge 110. The opening slot 120, defined by the edges 122, 124, are designed to be sharpened to fit under a cap to be pried.

It should be noted that the lid removal or opener tool 100 is ergonomically shaped and designed so that it can be manually grasped by the user along the length of the tool 100. The tool 100 can be grasped within the palm and fingers and can be rotated easily or moved for prying a cap or lid. Further, the central body platform 102 is generally planar in configuration and provides support for rotating the tool 100 and thus enables a user to easily open even a very tightly screwed cap or lid. Hand gripping areas may be added to the side rails to facilitate the twisting of the tool after a container has been placed within the channel 117 (see FIG. 1).

FIG. 3 illustrates a perspective view showing the opener tool 100 of the present invention used for opening a lid of a large jar in accordance with the disclosed architecture. As illustrated, the lid 302 of a container/jar 300 is placed in the channel 117 and moved along the rear surface 106 of the tool 100 such that the lid 302 abuts the side surfaces 112, 114 of the tool 100. Once the lid 302 is firmly placed between the side surfaces 112, 114 and rails 113 and 115 and supported by the rear surface 106, then, the tool 100 is easily rotated in a clockwise or counterclockwise direction by holding the tool 100 between the palm and fingers depending on the threaded orientation of the cap or recommended removal direction of the lid of the container.

It should be noted that the side surfaces 112, 114 and side rails 113, 115 prevent any lateral movement of the lid 302 along the rear surface 106 of the tool 100. Further, the material of the tool 100 is also a non-skid material, such as, by providing a coating of silicone or other non-slip material, and therefore, the lid 302 can be opened easily without applying much force. The tapered shape of the tool 100 allows jars having lids or caps of various sizes to be fixed along the rear surface 106 for opening and thus makes the tool 100 useful for a variety of lids and caps that require to be rotated for opening and closing.

FIG. 4 illustrates a perspective view showing the lid removal or opener tool 100 of the present invention used for opening a pry-type crimp cap in accordance with the disclosed specification. As illustrated, the edge 122 of the opening slot 120 is kept between the container 400 and the cap 402 such that the edge 122 can be pulled up by pulling the tool 100. The straight edge 124 of the opening slot 120 is placed on top surface 404 of the cap 402 for supporting the cap 402 and preventing the cap from physical damage. Once the cap 402 is firmly placed in the channel and between the edges 122, 124 then, the tool 100 is easily pulled upwards by holding the tool between fingers and thumb, for example near the front edge 108 to open the lid 402 (as shown in dashed lines).

It should be noted that the edges 122, 124 prevent any lateral movement of the lid 402 therebetween. The opening slot 120 does not damage the container 400 or the lid 402 and allows pry-type crimp lids or caps of various sizes to be fixed between the edges 122, 124 for opening.

FIG. 5 illustrates a perspective view showing the lid removal or beverage container opener tool 100 of the present invention used for opening a medicine or pill container in accordance with the disclosed specification. As illustrated, the central pull bar protrusion 116 is placed under the bottom edge 504 of the cap 502 such that the central pull bar protrusion 116 is pulled up for opening the cap 502. The central pull bar protrusion 116 is pulled up by pulling the front edge 108 of the tool 100 down thereby allowing the cap 502 to be easily opened (as shown in dashed lines) from a closed position (as shown in solid lines) without requiring much force.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein “lid removal”, “beverage container opener tool”, “opener tool”, “tool”, “multifunctional bottle opener”, and “container opener” are interchangeable and refer to the beverage container opener tool 100 of the present invention.

Notwithstanding the forgoing, the lid removal or beverage container opener tool 100 of the present invention can be of any suitable size and configuration as is known in the art without affecting the overall concept of the invention, provided that it accomplishes the above-stated objectives. One of ordinary skill in the art will appreciate that the lid removal or beverage container opener tool 100 as shown in the FIGS. Are for illustrative purposes only, and that many other sizes and shapes of the lid removal or beverage container opener tool 100 are well within the scope of the present disclosure. Although the dimensions of the lid removal or beverage container opener tool 100 are important design parameters for user convenience, the beverage container opener tool 100 may be of any size that ensures optimal performance during use and/or that suits the user’s needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A lid removal tool comprising;

a body having a front end and a rear end;

a first side surface;

a second side surface, wherein each of the first and second side surfaces comprises a side rail;

a corrugated edge disposed along at least one of the first and second side surfaces;

a channel created by the first and second side surfaces and the side rails;

a bottle cap opening slot comprising a straight edge and a curved beveled edge disposed within the body;

a corrugated edge beveled linear slot disposed within the body parallel to the first side surface;

a central pull bar protrusion extending between 0.5 and 1 inches out of the front end;

a smooth slot disposed in the body; and a ring opening in a forward portion of the body; and wherein a longitudinal axis passes through the bottle cap opening slot, extends between the smooth slot and the corrugated edge beveled linear slot, and passes through the ring opening, wherein the smooth slot and the corrugated edge beveled linear slot each have lower ends that are radially closer to the longitudinal axis than upper ends that are located further radially away from the longitudinal axis.

2. The lid removal tool as recited in claim 1, wherein the corrugated edge comprises a plurality of teeth ranging in size between 0.1" and 0.5".

3. The lid removal tool as recited in claim 1, wherein the corrugated edge comprises a plurality of teeth ranging in size between 0.1" and 0.25".

4. The lid removal tool as recited in claim 1, wherein each of the first side and the second side surfaces taper in width from the back end to the front end.

* * * * *